United States Patent [19]

Becker et al.

[11] Patent Number: 4,993,594
[45] Date of Patent: Feb. 19, 1991

[54] MULTI-CONSTITUENT MIXING AND METERING DISPENSER

[76] Inventors: Piper Becker, 23 E. Beardsley Ave. (1st Floor), Brant Beach, N.J. 08008; Charles Mitchell, 9 Fourth St., Barnegat, N.J. 08005

[21] Appl. No.: 413,234

[22] Filed: Sep. 27, 1989

[51] Int. Cl.⁵ .............................. B67D 5/22
[52] U.S. Cl. ...................... 222/48; 222/94; 222/136; 222/144.5; 222/145; 222/212; 137/607; 239/305; 239/307; 239/323; 239/414; 251/6
[58] Field of Search ............ 222/48, 94, 105, 136, 222/144.5, 145, 386.5, 401, 212, 95; 251/6; 137/607, 625.4; 239/304, 305, 307, 308, 327, 323, 414

[56] References Cited

U.S. PATENT DOCUMENTS

| | | | |
|---|---|---|---|
| 3,289,999 | 12/1966 | Konzak | 251/6 |
| 3,306,500 | 2/1967 | Williams | 222/209 |
| 3,592,365 | 7/1971 | Schwartzman | 222/209 |
| 3,814,287 | 6/1974 | Darborn et al. | 222/136 X |
| 3,837,533 | 9/1974 | Splan | 222/209 X |
| 4,194,535 | 3/1980 | Galland et al. | 239/414 X |
| 4,335,837 | 6/1982 | Bono | 222/145 X |
| 4,524,944 | 6/1985 | Sussman | 251/6 |
| 4,838,457 | 6/1989 | Swahl et al. | 222/145 X |
| 4,881,575 | 11/1989 | Smith | 239/307 X |

Primary Examiner—Andres Kashnikow
Assistant Examiner—Gregory L. Huson
Attorney, Agent, or Firm—Michael Ebert

[57] ABSTRACT

A multi-constituent mixing and metering dispenser adapted to yield a composition whose intermixed constituents are in relative proportions settable by the user. The extrudable constituents are stored in separate compressible pouches encased in face-to-face relation in the squeeze container of a supply section. Secured to the top of the container is a metering and mixing output section having a mixing chamber therein provided with an outlet. Each pouch has a flexible dip tube inserted therein leading to the mixing chamber in the output section. The container includes a check valve that is caused to close when the container is squeezed, thereby hermetically sealing the container and exerting pneumatic pressure on the pouches to cause extrusion of the constituents into the mixing chamber from which the resultant mixture is discharged through the outlet. Mounted in advance of the mixing chamber is a metering mechanism having a dial-turned shaft on which a series of cams is supported, each acting to pinch a respective tube to restrict flow of the related constituent into the mixing chambers. The cam arrangement is such that in the course of a full turn of the dial by the user, the relative proportions of the constituents is varied through a broad ratio range to produce a composition whose effective strength or other characteristic can be set by the user from a predetermined minimum value to a maximum value.

13 Claims, 2 Drawing Sheets

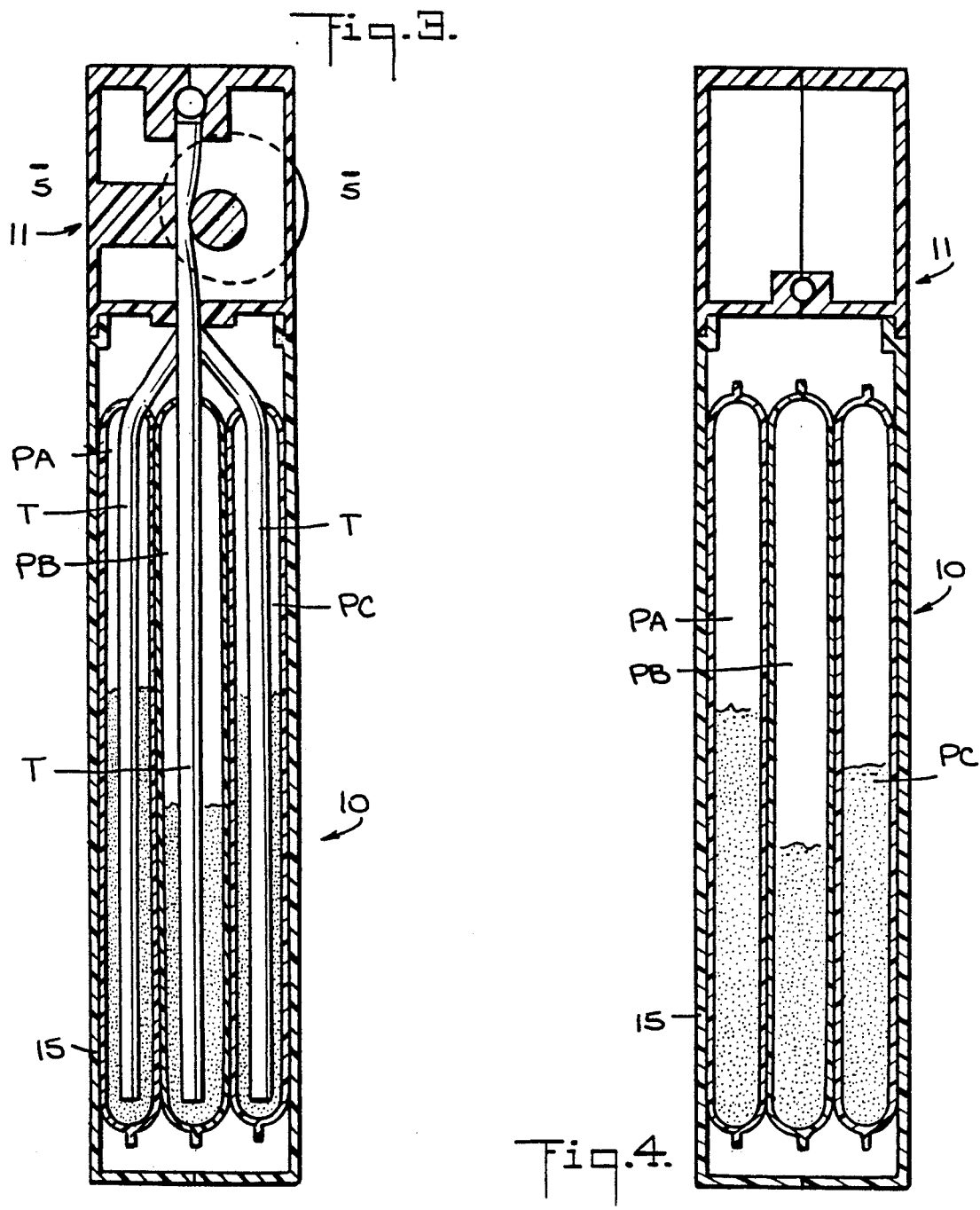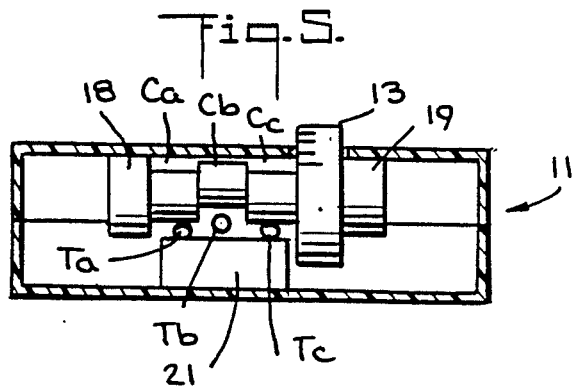

MULTI-CONSTITUENT MIXING AND METERING DISPENSER

BACKGROUND OF INVENTION

1. Field of Invention

This invention relates generally to manually-operated, multi-constituent dispensers, and more particularly to a dispenser in which the constituents are metered and then intermixed before being discharged to yield a composition in which the relative proportions of the constituents are settable by the user.

2. Status of Prior Art

Multi-constituent dispensers are known in which the constituents are separately stored and are intermixed before being discharged. Thus, the Moskowitz U.S. Pat. No. 3,031,104 shows a dispenser in the form of a squeeze tube divided into separate compartments, one containing a toothpaste and the other a germicidal agent which if intermixed and stored with the paste would in time result in deterioration of the toothpaste. When the Moskowitz dispenser tube is squeezed, the two constituents are then fed into a mixing chamber before being discharged as a mixture.

Along similar lines is the multi-compartment squeeze tube disclosed in the Cella U.S. Pat. 3,581,940 in which the compartments contain interactive fluid components and therefore must be packaged separately (such as constituents which when intermixed form a hair color preparation). In Cella, when the tube is squeezed, the liquids are then intermixed before being discharged.

In the Cella and Moscowitz patents, the volumetric ratio of the ingredients forming the mixture is predetermined by the parameters of the squeeze tube compartments, and therefore cannot be controlled by the user. A similar limitation exists in the two-component epoxy glue dispenser disclosed in the Wagenhals U.S. Pat. No. 3,029,983 in which the two components are stored in separate squeeze tubes having different transverse dimensions. These tubes are placed in a case under a pressure roller turned by a knob. As the roller is advanced, the glue components are concurrently extruded from the tubes in a ratio predetermined by the relative dimensions of the tubes.

The Ryder U.S. Pat. No. 4,736,872 shows separate flexible storage pouches containing different ingredients to be dispensed. Ryder's concern is with tinting of soft contact lens, and for this purpose, he provides a dispenser in which the fluids contained in the pouches are discharged in sequence to carry out a lens tinting operation.

The concern of the present invention is with a multi-constituent composition in which the relative proportions of the constituents determine the effective strength or other characteristic of the composition, and in which the characteristic must be appropriate to a given application. While the invention will be described as a dispenser for a sunscreen lotion composed of three intermixed constituents, it is to be understood that it is generally applicable to drugs or other compositions having at least two constituents which are not to be intermixed until the dispenser is actuated.

As noted in the article by Shaath, "The Chemistry of Sunscreens," that appeared in the Mar. 1986 issue of Cosmetics and Toiletries (pages 55 to 69), over a half million new cases of skin cancer a year are reported in the United States. The principal cause of such cancer is excessive exposure to damaging ultraviolet rays emanating from the sun.

Ultraviolet rays induce photochemical reactions harmful to the skin. The most damaging are those in the UV-A region (320–400 nm), those in the UV-B region (290–320 nm), and also those in the UV-C region (200–290 nm). Rays in the UV-C region normally need not be taken into account in sunscreens, for these deleterious rays are filtered out by the ozone layer in the stratosphere. But rays in the UV-A and UV-B regions are not filtered out by the ozone layer. The present invention is not, however, limited to sunscreens which are effective only with respect to rays in the UV-A and UV-B regions, for large gaps which have developed in the ozone layer in certain areas of the world, as a consequence of industrial air pollution and other factors, make it now necessary in these areas to provide sunscreens effective against UV-C rays.

The function of a conventional sunscreen lotion is mainly to shield the skin from radiation in the UV-B region, for these rays penetrate the skin and may cause severe burning or erythema. Limited radiation from the UV-A region is permitted to penetrate the skin, for these rays act to stimulate the formation of melanin which produces a tan and acts as a defense against burning. But excessive exposure to UV-A rays can also be damaging to the skin.

Sunscreen chemicals are of two types. One acts as a physical blocker which tends to reflect and scatter harmful UV radiation. Among chemicals which function as physical blocks are titanium oxide and petrolatum. The other type is a chemical absorber such as PABA and actyl salicylate that tends to absorb harmful radiation (both UV-A and UV-B) to render these innocuous.

The effectiveness of a sunscreen is currently graded by its Sun Protection Factor or SPF. This rating system indicates the number of hours of sun exposure equivalent to one hour of unprotected sun exposure. Thus an SPF-8 gives eight hours of exposure with protection equivalent to one hour of unprotected exposure. The useful SPF range is SPF-2 to SPF-12 or higher; the lowest value affording minimum protection and the highest, maximum protection.

The practical problem experienced by the typical consumer with a standard sunscreen lotion is that a given SPF rating is not effective under all circumstances; for while this rating may be adequately protective, say, in the early morning hours, it may be altogether inadequate toward noon or in the early afternoon. Moreover, individuals differ from each other not only in their natural skin color and in their sensitivity to ultraviolet radiation, but also in their objectives in regard to tanning. Thus some individuals wish to enhance their appearance by acquiring a deep tan without burning, while others are more concerned with possible skin damage and seek to minimize tanning even after many hours of exposure.

In order to provide sunscreens that satisfy the requirements of diverse individuals and accommodate quotidian changes in the intensity of the sun, it would normally be necessary to provide these individuals with a set of sun screen lotions each having different SPF ratings in the 2 to 12 range.

Thus if a family of seven were to go to the beach on a hot summer day, in order to protect the parents and children from the damaging effects of sun exposure and to meet their individual SPF requirements in the course of the day, even six sunscreen lotions having different SPF ratings may not be sufficient for this purpose. And it goes without saying that the need to bring along six sunscreen dispensers to the beach in addition to all of the other articles a family normally has to carry represents a practical drawback. It is more likely that no more than two or three lotions having different SPF ratings will be taken to the beach.

Because of the danger of premature aging of the skin and the risk of skin cancer resulting from excessive exposure to UV radiation, the need exists for a single sunscreen dispenser yielding an SPF grade appropriate to the prevailing intensity of the sun and to the skin of the individual being exposed.

SUMMARY OF INVENTION

In view of the foregoing, the main object of this invention is to provide a manually-adjustable, multi-constituent mixing and metering dispenser adapted to yield a sunscreen composition in which the relative proportions of these constituents are settable by the user to meet specific requirements.

More particularly, the object of this invention is to provide a sunscreen dispenser which selectively produces a composition in a broad SPF range; i.e., SPF 2 to SPF 12.

A significant feature of the invention is that the user may tailor the composition to satisfy his requirements, whether for a sunscreen lotion, a drug, a seasoning or any other composition having intermixed and metered constituents. Thus in the case of a multi-constituent analgesic lotion to be applied to the skin, the dispenser will be capable of selectively producing an analgesic composition of low, medium or high strength as well as intermediate values.

One practical advantage of a sunscreen dispenser according to the invention is that because the user can dial whatever SPF grade he wishes to apply to his own skin, it becomes possible for the user to empirically determine the SPF grade that best satisfies his individual requirements, without having to purchase a set of several sunscreen lotions having different SPF grades and to try out each of these lotions.

Each consumer has unique requirements, for no two individuals have skins which react to the same degree to ultraviolet ray exposure. An adjustable dispenser in accordance with the invention makes it feasible for an individual to run comparison tests between, say, SPF-4 and SPF-7 sunscreens on his own skin. In this way, the user can determine whether the higher SPF value, though more protective, is irritating to his skin, for some individuals have skins which are somewhat allergic to sunscreens. Thus the individual can find out for himself what SPF rating does him the most good.

Yet another object of the invention is to provide a settable multi-constituent dispenser which operates efficiently and which can be manufactured at relatively low cost.

Briefly stated, these objects are accomplished in a manually-operable multi-constituent mixing and metering dispenser adapted to yield a composition whose intermixed constituents are in relative proportions that are settable by the user. The constituents, which are extrudable, are stored in separate compressible pouches encased in face-to-face relation in the flexible squeeze container of a supply section. Secured to the top of the container is a metering and mixing output section having a mixing chamber therein provided with an outlet.

Each pouch in the supply section has with a flexible dip tube inserted therein leading to the mixing chamber in the output section. The container includes a check valve that is caused to close when the container is squeezed, thereby hermetically sealing the container and exerting pneumatic pressure on the pouches to cause extrusion of the constituents into the mixing chamber from which the resultant mixture is discharge through the outlet. Mounted in advance of the mixing chamber is a metering mechanism having a dial-turned shaft on which is supported a series of cams, each acting to pinch a respective tube to restrict flow of the related constituent into the mixing chamber. The cam arrangement is such that in the course of a full turn of the dial by the user, the relative proportions of the constituents is varied through a broad ratio range to produce a composition whose effective strength or other characteristic can be set by the user from a predetermined minimum value to a maximum value.

BRIEF DESCRIPTION OF DRAWINGS

For a better understanding of the invention as well as other objects and further features thereof, reference is made to the following detailed description to be read in conjunction with the accompanying drawings, wherein:

FIG. 3 is a transverse section taken in the plane indicated by line 3—3 in FIG. 2;

FIG. 4 is a transverse section taken in the plane indicated by line 4—4 in FIG. 2; and FIG. 5 is a top view of the metering mechanism included in the output section of the dispenser.

DETAILED DESCRIPTION OF INVENTION

Figure 2:
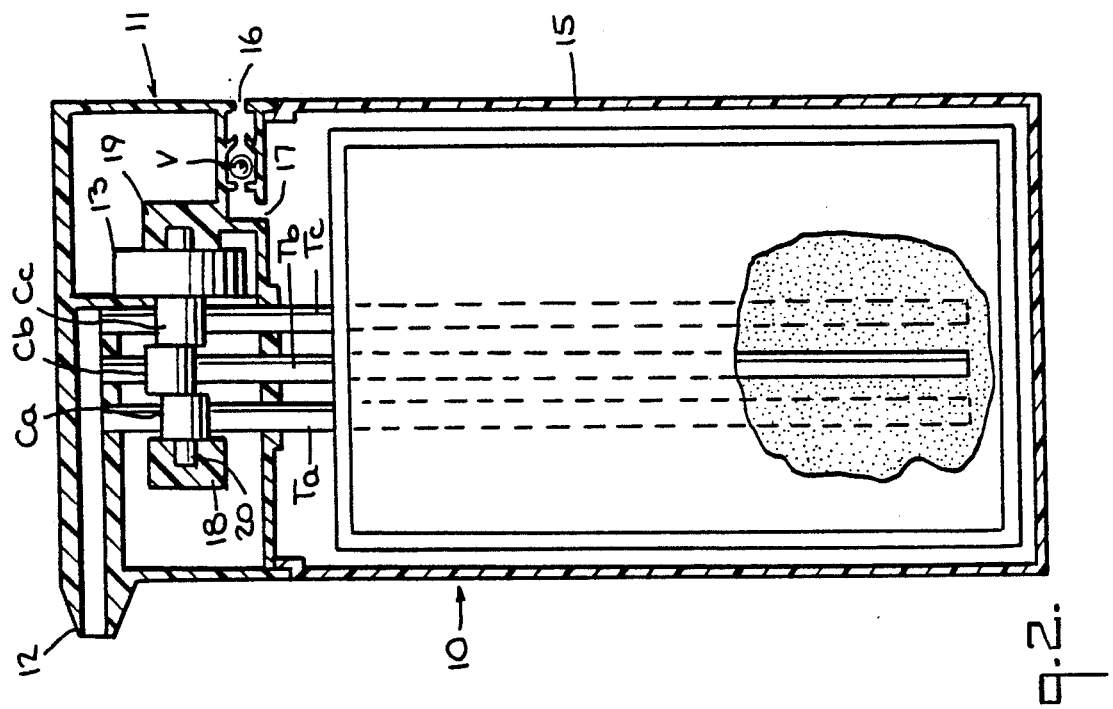
FIG. 2 is a longitudinal section taken through the dispenser.
Figure 1:
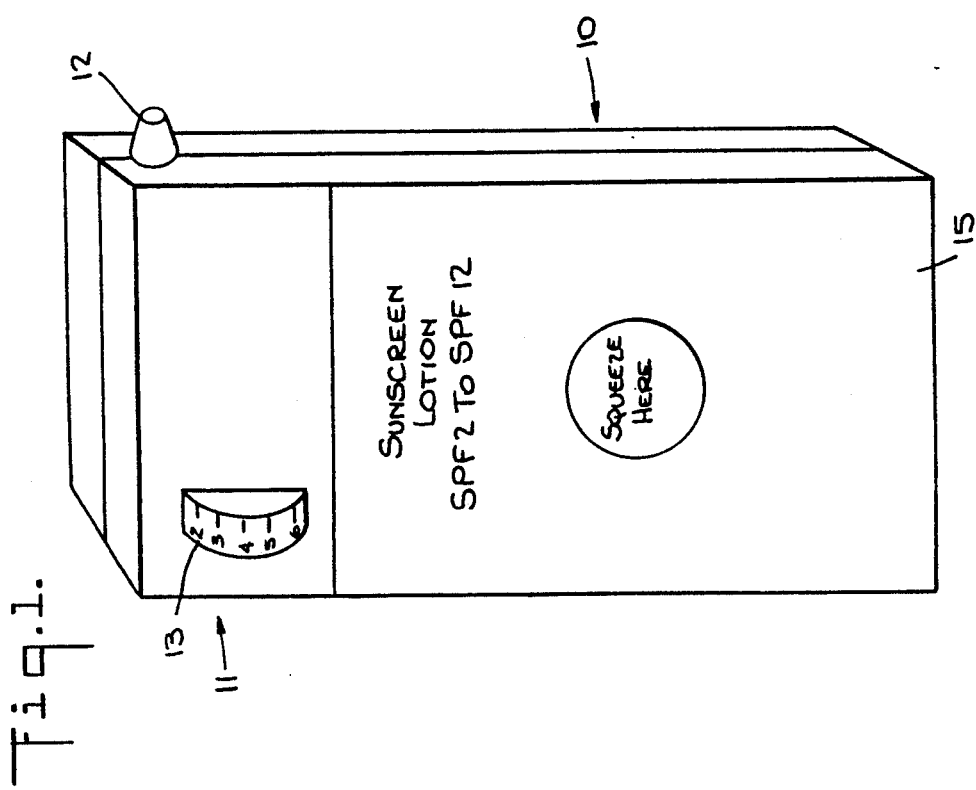
FIG. 1 is a perspective view of a multi-constituent metering and mixing dispenser in accordance with the invention.

Referring now to FIG. 1, there is shown a manually operable, multi-constituent mixing and metering dispenser in accordance with the invention adapted to produce a composition whose extrudable constituents are in relative proportions that are settable by the user.

The invention will be described as a dispenser for a sunscreen lotion having three intermixed constituents providing a sunscreen composition in the SPF-2 to SPF-12 range, the rating being selected by the user. However, as previously indicated, the dispenser is by no means limited to sunscreens and is applicable to other multi-constituent compositions. The term constituent, as used herein, is not limited to a single ingredient, for each constituent may consist of several ingredients which together form one component of the composition to be produced.

The dispenser consists of two integrated sections; namely, a squeezable supply section 10 within which is encased compressible pouches each filled with an extrudable constituent, and a metering and mixing output section 11 in which the constituents supplied thereto by the supply section are metered and intermixed to produce a composition that is discharged through an outlet nozzle 12. Output section 11 is provided with a thumbwheel dial 13 which is settable by the user to provide a composition of the desired strength or other characteristic. Thus in the case of a sunscreen lotion, dial 13 is calibrated in the SPF-2 to SPF-12 range and is turnable by the user relative to an arrow 14 to produce a selected SPF rating.

As shown in FIGS. 2 to 5, supply section 10 includes a box-like container 15 fabricated of resilient plastic material such as polyvinyl chloride or polyethylene having a strong memory so that when container 15 is squeezed by the user it is deformed, and when released by the user, it resumes its normal shape. Encased within container 15 are three generally rectangular compressible bladders or pouches PA, PB and PC of rubber-like material in face-to-face relation. Each pouch is filled with one of the three constituents which are in paste or cream form so that they may be extruded from the pouch when the pouch is compressed.

Inserted in the respective pouches and sealed thereto are dip tubes Ta, Tb and Tc formed of flexible plastic tubing. Each dip tube extends from its pouch into a mixing chamber MC formed in output section 11. The output section is molded of rigid plastic material, preferably in two complementary halves for ease of assembly. The three components intermingled in mixing chamber MC are discharged therefrom through outlet nozzle 12.

Also disposed in output section 11 is an air check valve V which is shown as being of the ball type but may be in flapper or other form. Check valve V is interposed between an air vent 16 disposed on one side of the output section and a port 17 formed in the top of container 15. When container 15 is squeezed by the user, the resultant air pressure acts to close check valve V, thereby hermetically sealing the container. The resultant internal pneumatic pressure is exerted equally on pouches PA, PB and PC which are concurrently compressed to extrude the respective constituents through dip tubes Ta, Tb and Tc into mixing chamber MC in the output section. When the user releases the flexible container, it resumes its normal form to create a negative pressure acting to open check valve 15. Thus the pouches are normally exposed to atmospheric pressure.

Supported between bearings 18 and 19 in output section 11 is the shaft 20 of a metering mechanism on which is mounted a series of cams Ca, Cb and Cc, the thumbwheel dial 13 being mounted on the same shaft so that the user can turn the shaft. The metering mechanism may be molded of the same rigid, synthetic plastic material which forms the output section.

Cams Ca, Cb and Cc each act to pinch a corresponding dip tube (Ta, Tb and Tc) against an anvil 21. The cams are in the form of cylindrical drums that are eccentrically mounted on shaft 20 with a different degree of eccentricity so that at each rotary angle of the shaft, as determined by the dial setting, each cam then pinches the corresponding tube to a different degree against the anvil to constrict the tube accordingly. The volume of flow of the constituent through the tube into the mixing chamber is a function of its existing constriction.

Hence the degree to which the dip tubes are pinched determines the volume of the respective constituents which are admitted into mixing chamber MC. The cam arrangement is such that the relative volumetric proportions of the constituents fed into the mixing chamber can be varied throughout a broad ratio range in the course of a full turn of the dial to produce a composition whose effective strength, SPF grade or other characteristic can be set by the user from a predetermined minimum to a maximum value.

When the dispenser is used to dispense sunscreen lotion having three intermixed constituents, pouch PA is reserved for a base lotion constituent having no sunscreen additives, this constituent serving to dilute the constituents which fill pouches PB and PC which include sunscreen additives having different properties.

Constituent A in pouch PA is an additive-free base lotion composed of the following ingredients:

Constituent A

CERASYNT MN
EMULSYNT 1055
CERAPHYL 368
CETYL ALCOHOL
DOW CORNING 200 FLUID
PROPYLPARABEN
STERIC ACID XXX
WATER DEIONIZED
TRIETHANOLAMINE 88%
GLYCERINE
GLYDANT
METHYLPARABEN
FRAGRANCE

Constituent B in pouch PB consists primarily of the same base lotion as in constituent A plus an additive (padimate O that absorbs the UV-B rays of the sun. This additive is active across the entire SPF-2 to SPF-12 spectrum.

Constituent B

CERASYNT MN
EMULSYNT 1055
CERAPHYL 368
CETYL ALCOHOL
DOW CORNING 200 FLUID
PROPYLPARABEN
STERIC ACID XXX
WATER DEIONIZED
TRIETHANOLAMINE 88%
GLYCERINE
METHYLPARABEN
FRAGRANCE
PADIMATE O (active ingredient)

Constituent C consists primarily of the same base lotion as in constituent A plus an additive (oxybenzone) that absorbs the UV-A rays of the sun. This additive in combination with padimate O included in constituent B makes possible a much higher sun protection factor (SPF).

Constituent C

CERASYNT MN
EMULSYNT 1055
CERAPHYL 368
CETYL ALCOHOL
DOW CORNING 200 FLUID
PROPYLPARABEN
STERIC ACID XXX
WATER DEIONIZED
TRIETHANOLAMINE 88%
GLYCERINE
GLYDANT
METHYLPARABEN
FRAGRANCE
OXYBENZONE (active ingredient)

Thus the relative proportions of constituents A, B and C metered into mixing chamber MC by the metering mechanism determine the SPF rating of the composition yielded by the dispenser.

While there has been shown and described a preferred embodiment of a multi-constituent mixing and metering dispenser in accordance with the invention, it will be appreciated that many changes and modifications may be made therein without, however, departing from the essential spirit thereof. Thus the dispenser may include two rather than three pouches as shown, or a greater number.

The case of the dispenser need not be rectangular, as shown, but may be in other geometric configurations in which the upper or output section is of rigid material and the lower supply section is of flexible material. Nor is it necessary to make a full turn of the dial in order to run through the full range of values, for in practice the arrangement may be such that a partial turn, say, 270 degrees, is sufficient to cover the full range.

Also, in practice the pouches need not all have the same capacity and may have different capacities, depending on the relative proportions of the ingredients in the desired composition. On the average, the relative capacities of the pouches should be such that all pouches are exhausted at about the same time if the dial were set at the middle of the range.

We claim:

1. A manually-operable, multi-constituent mixing and metering dispenser adapted to yield a composition whose intermixed constituents are in relative proportions that are settable by the user, said dispenser comprising:
   (a) a supply section including a plurality of compressible pouches, each being provided with a dip tube and being filled with one of the constituents in which the dip tube is immersed, said pouches being encased in a flexible squeeze container which when squeezed applies pressure to the pouches concurrently to extrude the constituents through the tubes; and
   (b) a metering and mixing output section secured to the container, said output section including a mixing chamber into which is fed the constituents extruded through the dip tubes, the intermixed constituents being discharged from an outlet, and a metering mechanism disposed in advance of the mixing chamber and operated manually by a control element to pinch said dip tubes and thereby differentially restrict the flow therethrough to adjust the relative proportions of the constituents fed into the mixing chamber throughout a broad ratio range to produce a composition whose effective strength or other characteristic can be set by the user from a predetermined minimum to maximum value.

2. A dispenser as set forth in claim 1, wherein said pouches have different capacities.

3. A dispenser as set forth in claim 1, having three pouches, each of which is filled with a constituent of a sunscreen lotion, whereby the composition produced has an SPF rating that depends on the setting of the control element.

4. A dispenser as set forth in claim 3, wherein one of the constituents is a base lotion having no sunscreen blocking additive therein, and the other constituents include sunscreen blocking additives.

5. A dispenser as set forth in claim 1, wherein said metering mechanism includes a shaft on which are mounted a series of cams and a thumbwheel dial coupled to the shaft which functions as the control element to rotate the cams, each being arranged in the course of rotation to more or less pinch a respective tube and thereby determine the volume of constituent flow into the mixing chamber.

6. A dispenser as set forth in claim 5, wherein behind each tube is an anvil against which the pinched tube is pressed.

7. A dispenser as set forth in claim 5, wherein each cam is eccentrically mounted on the shaft with a different degree of eccentricity.

8. A dispenser as set forth in claim 5, wherein the pouches have relative capacities such that all pouches are exhausted at substantially the same time when the dial is set at the middle of the range.

9. A dispenser as set forth in claim 1, wherein said container has a box-like form, and said pouches are in face-to-face relation in said container.

10. A dispenser as set forth in claim 9, wherein said container is provided with an air check valve which is caused to close when the container is squeezed to hermetically seal the container whereby a pneumatic pressure is then applied to the pouches.

11. A dispenser as set forth in claim 10, wherein said check valve is a ball valve interposed between a port in said container and an air vent in said output section.

12. A dispenser as set forth in claim 9, wherein said pouches are in generally rectangular form with their sides in face-to-face relation whereby said box-like container is almost fully occupied.

13. A dispenser as set forth in claim 12, wherein said pouches are formed of rubber-like material.

* * * * *